United States Patent
Zhu et al.

(10) Patent No.: US 11,088,970 B2
(45) Date of Patent: Aug. 10, 2021

(54) INTERACTIVE MESSAGE DISPLAY METHOD, APPARATUS AND SYSTEM, AND STORAGE MEDIUM

(71) Applicant: TENCENT TECHNOLOGY (SHENZHEN) COMPANY LIMITED, Guangdong (CN)

(72) Inventors: Lin Zhu, Shenzhen (CN); Fang Zhou He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 255 days.

(21) Appl. No.: 15/774,027

(22) PCT Filed: Aug. 22, 2017

(86) PCT No.: PCT/CN2017/098477
§ 371 (c)(1),
(2) Date: May 7, 2018

(87) PCT Pub. No.: WO2018/036478
PCT Pub. Date: Mar. 1, 2018

(65) Prior Publication Data
US 2018/0316632 A1    Nov. 1, 2018

(30) Foreign Application Priority Data
Aug. 24, 2016  (CN) .......................... 201610714785.8

(51) Int. Cl.
*G06F 3/0481* (2013.01)
*H04L 12/58* (2006.01)
*H04L 29/08* (2006.01)

(52) U.S. Cl.
CPC ............ *H04L 51/02* (2013.01); *G06F 3/0481* (2013.01); *H04L 67/02* (2013.01); *H04L 67/36* (2013.01)

(58) Field of Classification Search
CPC ............... G06F 3/04886; G06F 3/0236; G06F 3/04883; G06F 1/1626; G06F 3/0238;
(Continued)

(56) References Cited

U.S. PATENT DOCUMENTS

2010/0306669 A1* 12/2010 Della Pasqua ....... G06Q 10/107
715/752
2012/0198002 A1    8/2012 Goulart et al.
(Continued)

FOREIGN PATENT DOCUMENTS

| CN | 102685020 A | 9/2012 |
| CN | 103414627 A | 11/2013 |

(Continued)

OTHER PUBLICATIONS

International Search Report of PCT/CN2017/098477 dated Nov. 24, 2017 [PCT/ISA/210].
(Continued)

*Primary Examiner* — Di Xiao
(74) *Attorney, Agent, or Firm* — Sughrue Mion, PLLC

(57) ABSTRACT

A method, apparatus and system for displaying an interactive message, and a storage medium are provided. The method includes acquiring, by a client, an interactive message. The interactive message is added into a queue of messages to be displayed, and a pre-created message base class with a motion path is invoked according to a display duration to sequentially display interactive messages in the queue of messages to be displayed on an interactive inter-
(Continued)

face. The message base class with the motion path specifies motion paths of the interactive messages on the interactive interface.

18 Claims, 7 Drawing Sheets

(58) Field of Classification Search
CPC .... G06F 17/276; G06F 3/0484; G06F 3/0237; G06F 3/0482; G06F 3/0488; G06F 1/163; G06F 21/31; G06F 2203/04806; G06F 3/0414; G06F 3/04817; G06F 3/04842; G06F 3/04892; G06F 3/04895; G06F 3/167; G06F 9/4856; G06F 11/1458; G06F 19/3468; G06F 1/1622; G06F 1/1643; G06F 1/1656; G06F 1/1666; G06F 1/1679; G06F 1/169; G06F 1/1694; G06F 1/1698; G06F 3/0202; G06F 3/0233; G06F 3/04815; G06F 9/4448; G06F 15/0225; G06F 17/273; G06F 17/30684; G06F 1/165; G06F 1/1664; G06F 21/10; G06F 2203/04805; G06F 2203/04807; G06F 2203/04809; G06F 2221/0711; G06F 2221/2115; G06F 2221/2129; G06F 2221/2135; G06F 2221/2137; G06F 2221/2153; G06F 3/017; G06F 3/018; G06F 3/02; G06F 3/0216; G06F 3/0219; G06F 3/023; G06F 3/0235; G06F 3/0346; G06F 3/03547; G06F 3/0481; G06F 3/04812; G06F 3/04847; G06F 3/0489; G06F 3/1446; G06F 9/4443
See application file for complete search history.

(56) References Cited

U.S. PATENT DOCUMENTS

| 2014/0229853 | A1* | 8/2014 | Cho | G06Q 10/20 715/752 |
| 2014/0279025 | A1* | 9/2014 | Klanjsek | G06Q 30/0276 705/14.64 |
| 2015/0089439 | A1* | 3/2015 | Wada | G06F 3/0481 715/784 |
| 2015/0339727 | A1* | 11/2015 | Yi | H04N 21/41415 705/14.45 |
| 2017/0201474 | A1* | 7/2017 | Ding | H04L 51/04 |

FOREIGN PATENT DOCUMENTS

| CN | 104518941 | A | 4/2015 |
| CN | 104618813 | A | 5/2015 |
| CN | 105205164 | A | 12/2015 |
| CN | 105653167 | A | 6/2016 |
| CN | 105867900 | A | 8/2016 |
| CN | 105872679 | A | 8/2016 |
| CN | 106331345 | A | 1/2017 |

OTHER PUBLICATIONS

Communication dated Aug. 16, 2019 by The State Intellectual Property Office on the P.R. of China in application No. 201610714785.8.
Written Opinion dated Nov. 24, 2017 from the International Bureau in International Application No. PCT/CN2017/098477.
Communication dated May 15, 2020 from the State Intellectual Property Office of the P.R.C. in Application No. 201610714785.8.
Communication dated Sep. 16, 2020, from the State Intellectual Property Office of the P.R. of China in Application No. 201610714785.8.

* cited by examiner

INTERACTIVE MESSAGE DISPLAY METHOD, APPARATUS AND SYSTEM, AND STORAGE MEDIUM

CROSS-REFERENCE TO RELATED PATENT APPLICATIONS

This application is a U.S. national stage application under 35 U.S.C. § 371 of International Application No. PCT/CN2017/098477, filed on Aug. 22, 2017, which claims priority from Chinese Patent Application No. 201610714785.8, filed with the Chinese Patent Office on Aug. 24, 2016, the disclosures of which is incorporated by reference in its entirety.

BACKGROUND

1. Field

The present disclosure relates generally to the field of, and more specifically relates to an interactive message display method, apparatus and system, and a computer readable storage medium.

2. Description of Related Art

According to existing techniques, when a plurality of interactive messages are continuously displayed on an interactive interface (e.g., a world wide web (WEB) front page) provided for users, the interactive messages are displayed on the interactive interface by adding a document object model (DOM) node as a container for the interactive messages. However, because of browser implementation, every time a DOM node is added, the interactive interface is actually re-rendered. When it is necessary to continuously display a plurality of interactive messages, frequent rendering of the interactive interface easily results in a phenomenon of lag of the interactive interface. The resulting display of the interactive messages will be intermittent and not smooth, and moreover, it becomes difficult to control a motion path of the interactive information.

SUMMARY

Embodiments of the present disclosure provide an interactive message display method, apparatus and system, and a computer readable storage medium, capable of reducing a phenomenon of lag of an interactive interface, efficiently and smoothly displaying an interactive message and also flexibly controlling a motion path of the interactive message.

According to an aspect of one or more exemplary embodiments, there is provided a method. The method includes acquiring, by a client, an interactive message. The interactive message is added into a queue of messages to be displayed, and a pre-created message base class with a motion path is invoked according to a display duration to sequentially display interactive messages in the queue of messages to be displayed on an interactive interface. The message base class with the motion path specifies motion paths of the interactive messages on the interactive interface.

According to other aspects of one or more exemplary embodiments, there is also provided other methods, an apparatus and a non-transitory computer readable storage medium consistent with the method.

BRIEF DESCRIPTION OF THE DRAWINGS

The accompanying drawings, which are included to provide further understanding and are incorporated and constitute a part of this specification, illustrate disclosed embodiments and together with the description serve to explain the principles of the disclosed embodiments. In the drawings.

DETAILED DESCRIPTION

The following clearly and completely describes the technical solutions in the example embodiments of the present disclosure with reference to the drawings. Apparently, the described example embodiments are merely some but not all of the embodiments of the present disclosure. All other embodiments obtained by a person of ordinary skill in the art based on the embodiments of the present disclosure without any creative work shall fall within the protection scope of the present disclosure.

It should be noted that terms "including", "containing" or any other variants thereof are intended to cover non-exclusive inclusions, so that a method or apparatus including a series of elements not only includes explicitly stated elements, but also includes other elements that are not explicitly listed, or further includes elements that are inherent to the implementation of the method or apparatus. Unless otherwise specified, an element limited by "including a/an . . . " does not exclude other same elements existing in the method or apparatus including the element (e.g., steps in the method or portions in the apparatus, the portions here may be some circuits, some processors, some programs or software, etc., or may be units, modular or non-modular).

A terminal described in the example embodiments of the present disclosure may include a mobile phone, a laptop, a desktop computer, a tablet computer, a vehicle-mounted terminal, a smart wearable device and the like. At least one type of Internet application, including, but not limited to, a browser application, an instant messaging application, a social networking services (SNS) application, etc. may be run in the terminal.

Figure 1:
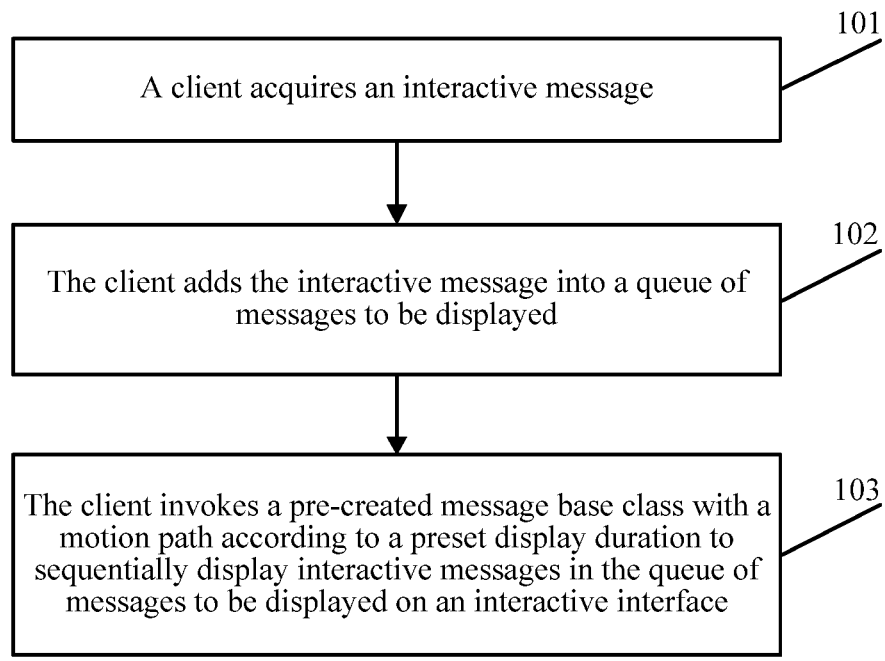
FIG. 1 is a flowchart of a first embodiment of an interactive message display method according to an example embodiment.

FIG. 1 is a flowchart of a first example embodiment of an interactive message display method. The interactive message display method includes the following:

101: A client acquires an interactive message.

In some embodiments, the client may be the above described Internet application running on a terminal. In some implementations, the interactive message may be a text, an image, an expression, or the like, including an interactive message input locally by the client and an interactive message acquired from a server.

In an example embodiment, the client may acquire the locally input interactive message, and may also send a polling request to the server and receive an interactive message returned by the server in response to the polling request. The polling request may be long polling, that is, the client constantly sends a polling request to the server to acquire the latest interactive message.

102: The client adds the interactive message into a queue of messages to be displayed.

According to an implementation, the client stores acquired interactive information in a queue of messages to be displayed, and may determine whether it is a locally input interactive message by means of a source tag of the interactive message. If the interactive message is locally input, the client adds the interactive message into the queue of messages to be displayed from the head of the queue. If the interactive message is acquired by sending a polling request to the server, the interactive message is added into the queue of messages to be displayed from the tail of the queue, so as to ensure that the locally input interactive message may be preferentially displayed, interactive information first stored in the queue of messages to be displayed in the locally input interactive message is displayed first, and interactive information first stored in the queue of messages to be displayed in the interactive message acquired by sending the polling request to the server is displayed first.

103: The client invokes a pre-created message base class with a motion path according to a preset display duration to sequentially display interactive messages in the queue of messages to be displayed on an interactive interface.

Here, the base class refers to a classification type containing all entity commonalities in an object-oriented design, the message base class with a motion path is used for specifying a motion path of the interactive message on the interactive interface, and it may be created according to a message base class containing message public attributes and a motion path base class containing motion path public attributes.

In some implementations, the message base class containing message public attributes (such as message content radius, rotation angle and transparency) and the motion path base class containing motion path public attributes (such as track start point and track end point) may be created in advance, and the code implementation of the message base class may be as follows:

```
function Message (radius, content) {
    if (radius === undefined) { radius = 64; }
    this.x = 0;
    this.y = 0;
```

-continued

```
    this.radius = radius;
    this.rotation = 0;
    this.scaleX = 0;
    this.scaleY = 0;
    // if a message type is an image
    if(content.type === 'image') {
        this.image = content;
    }
    this.globalAlpha = 1;
}
Message.prototype.draw = function (context) {
    context. save( );
    context.translate(this.x, this.y);
    context.rotate(this.rotation);
    context.scale(this.scaleX, this.scaleY);
    // draw a message content on a canvas element
    context.draw(this.content);
    context.restore( );
}
```

Where this.radius: is a content radius during message display, used for controlling the size of a graphic message;

this.x: location, on an X axis of a screen, of a message during display;

this.y: location, on a Y axis of a screen, of a message during display;

this.rotation: rotation angle of a message, which may be used for an animation effect;

this.scaleX: scale of a message on an X axis of a screen;

this.scaleY: scale of a message on a Y axis of a screen;

this.content: content of a message, which may be an image or a text;

this.lineWidth: width of a line if a message is a linear image;

this.globalAlpha: transparency during message display, a value ranging from 0 to 1;

Message.prototype.draw(context): draw a message on a canvas element via a context object of the canvas element.

The code implementation of the motion path base class may be as follows:

```
/**
 * @constructor
 */
function MotionPath ( ) {
    this.paths = [ ];
    this.start = 0;
    this.end = NaN;
}
```

Where this.paths: motion paths having been stored and defined, are displayed in order.

this.start: start point of the defined path;

this.end: end point of the defined path.

In some implementations, the code implementation of a path addition method for the motion path base class may be as follows:

```
/**
 * add a path into a current motion path list
 * @param {linear Bezier curve|quadratic Bezier curve|cubic Bezier curve}
path
 * @return {MotionPath} The current motion path instance.
 */
MotionPath.prototype.addPath = function (path) {
  this.paths.push(path);
  this.end = path.end;
  return this;
};
define corresponding Bezier curves, including a linear Bezier curve, a
quadratic Bezier curve and a cubic Bezier curve;
// linear Bezier curve (i.e., line)
MotionPath.prototype.lineTo = function (end) {
   return this.addPath(new LinearPath(end));
};
function LinearPath (end) {
   this.control = 0;
   this.end = end;
}
LinearPath.prototype.interpolate = function (start, t) {
   return start + t * (this.end - start);
};
// quadratic Bezier curve (i.e., arc)
MotionPath.prototype.quadraticCurveTo = function (control, end) {
  return this.addPath(new QuadraticPath(control, end));
};
function QuadraticPath (control, end) {
  this.control = control;
  this.end = end;
}
QuadraticPath.prototype.interpolate = function (start, t) {
  return (1 - t) * (1 - t) * start + 2 * (1 - t) * t * this.control + t * t * this.end;
};
// cubic Bezier curve (i.e., S curve)
MotionPath.prototype.bezierCurveTo = function (control1, control2, end) {
  return this.addPath(new BezierPath(control1, control2, end));
};
function BezierPath (control1, control2, end) {
  this.control1 = control1;
  this.control2 = control2;
  this.end = end;
}
BezierPath.prototype.interpolate = function (start, t) {
  return Math.pow(1 - t, 3) * start + 3 * Math.pow(1 - t, 2) * t * this.control1 +
3 * Math.pow(1 - t, 1) * Math.pow(t, 2) * this.control2 + Math.pow(t, 3) * this.end;
};
```

The above-mentioned parameter t may change from 0 to 1 in the process of drawing a Bezier curve, in order to express the degree of completion of the Bezier curve from a start point to an end point.

The interpolate(start,t) function may be used for returning x or y axis coordinates on the corresponding Bezier curve when the degree of completion is t.

In an example embodiment, a message base class with a motion path is created according to the above-mentioned message base class and motion path base class as well as the defined Bezier curves. In some implementations, the code implementation of the message base class with a motion path may be as follows (illustrated with a cubic Bezier curve):

```
function MessgaeWithMotionPath(message, startPoint, canvas) {
   this.message = message;
   this.startPoint = startPoint;
   this.xPath = new MotionPath( );
   this.yPath = new MotionPath( );
   this.endPoint = {
```

-continued

```
      x: 0.5 * canvas.width,
      y: 0.1 * canvas.height
   };
   this.ctrlPt0 = {x: this.endPoint.x + 20, y: 0.5 * canvas.height};
   this.ctrlPt1 = {x: this.endPoint.x + 20, y: 0.7 * canvas.height};
   this.xPath.start = this.startPoint.x;
   this.xPath.bezierCurveTo(this.ctrlPt0.x, this.ctrlPt1.x, this.endPoint.x);
   this.yPath.start = this.startPoint.y;
   this.yPath.bezierCurveTo(this.ctrlPt0.y, this.ctrlPt1.y, this.endPoint.y);
   this.time = 0;
   this.change = 0.005;
}
BubbleWithMotionPath.prototype.draw = function(ctx) {
   ctx.beginPath( );
   ctx.moveTo(this.startPoint.x, this.startPoint.y);
   ctx.bezierCurveTo(this.ctrlPt0.x, this.ctrlPt0.y, this.ctrlPt1.x,
this.ctrlPt1.y, this.endPoint.x, this.endPoint.y);
   this.message.x = this.xPath.interpolate(this.time);
   this.message.y = this.yPath.interpolate(this.time);
   this.time = this.time + this.change;
```

-continued

```
    if(this.time > 1) {
        this.time = 0;
    }
    this.message.draw(ctx);
};
```

Where this.time: time here refers to a current degree of completion of an entire Bezier path, a value ranging from 0 to 1;

this.change: the rate of drawing a Bezier curve, wherein as the value is larger, the Bezier curve is completed more quickly;

this.message.x=this.xPath.interpolate(this.time): set an x axis coordinate of a message as an x coordinate of the tail end of a currently completed part of a Bezier path;

this.message.y=this.yPath.interpolate(this.time): set a y axis coordinate of a message as a y coordinate of the tail end of a currently completed part of a Bezier path;

this.time+=this.change: by adding the value of this.change to this.time, the degree of completion of the Bezier path continuously is enabled to approach 1, and the Bezier path is completed until this.time is equal to 1, and after the message is displayed completely, this completely displayed message may be deleted from a message queue;

ctx.moveTo(x,y): move a drawing start point of a canvas element to a location specified by (x,y);

ctx.bezierCurveTo(this.ctrlPt0.x,this.ctrlPt0.y, this.ctrlPt1.x,this.ctrlPt1.y,this.e ndPoint.x,this.endPoint.y): according to control points ctrlPt0 and ctrlPt1 and an end point of a Bezier curve, draw a cubic Bezier curve;

this.message.x=this.xPath.interpolate(this.time): set an x coordinate of a message body as an x axis coordinate of a current degree of completion of a Bezier path;

this.message.y=this.yPath.interpolate(this.time): set a y coordinate of a message body as a y axis coordinate of a current degree of completion of a Bezier path;

This.message.draw( ) draw a message body on a canvas element.

It should be noted that it is illustrated merely with the cubic Bezier curve. According to some implementations, a more complex Bezier curve such as a quartic Bezier curve and a quintic Bezier curve may also be used to create the above-mentioned message base class with a motion path.

Similarly, the setting of the above-mentioned related parameter values may also be flexibly adjusted, without limitation, according to some implementations.

In some implementations, hyper text markup language (HTML) 5 having a new canvas element, and a script language (such as JavaScript) may be used to draw on the canvas element to display an interactive message. A display duration of each interactive message on an interactive interface may be set, for example, as 300 ms, and a next interactive message is not displayed until the display duration of one interactive message expires. On the one hand, the situation that it is difficult for a user to distinguish densely-displayed interactive messages is avoided, and on the other hand, the fact that due to certain limitations on the performance of a canvas element, the performance of the canvas element for displaying an interactive message is affected may also be avoided.

In some implementations, a client draws each interactive message in a queue of messages to be displayed on a canvas element of an interactive interface in order from the head of the queue to the tail of the queue according to a preset display duration by invoking the above message base class with a motion path. The message base class with a motion path controls a motion path of an interactive message.

Figure 2:
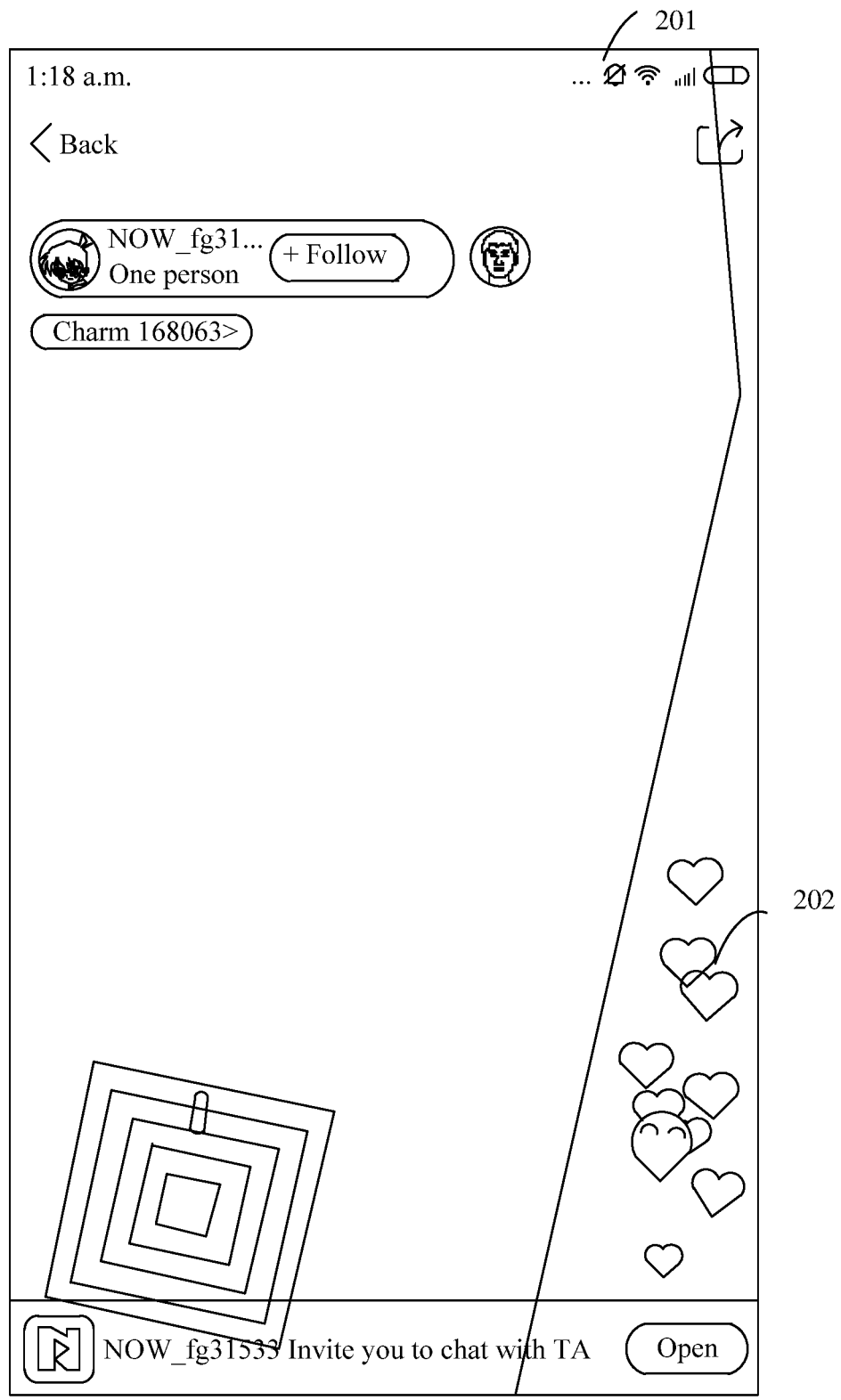
FIG. 2 is a schematic diagram of an interactive interface according to the an example embodiment.

FIG. 2 is a schematic diagram of an interactive interface 201 according to the an example embodiment. FIG. 2 shows a plurality of interactive messages 202 (i.e., heart-shaped patterns) at a lower right corner of the interactive interface 201. In FIG. 2, after the client acquires these heart-shaped patterns 202, one of the plurality of acquired heart-shaped patterns 202 may be displayed every 300 ms, i.e., a heart-shaped pattern 202 is drawn on the canvas element by invoking the above described message base class with a motion path, and a motion path thereof such as an S-shaped path on the interactive interface within 300 ms is controlled.

In an example embodiment, after each interactive message is displayed completely, the client deletes it from the queue of messages to be displayed.

In the example embodiments of the present disclosure, the code implementation of invoking the above message base class with a motion path to display an interactive message via a canvas element may be as follows:

```
// initialize an empty array to store a message body with a path
var messageWithList = [ ];
// initialize a new message body, and transmit the content of the message body in as a parameter
        var newMessage = new Message(radius, content);
// initialize a new message body object with a path, and transmit the message body that was just initialized in as a parameter
        var newMessageWithPath = new MessageWithMotionPath(newMessage);
// the following is pseudo codes
// if a message is a local message, directly fill it in the head of a queue
if(newMessage is localMessage) {
    messageWithList.unshift(newMessageWithPath)
} else if (newMessage is longpollMessage) { // if a message is data obtained by long polling
// if a message is data obtained by long polling and locally sent, do nothing, i.e., directly discard this message
        if(newMessage is localMessage) {
        } else {
            // otherwise, continue to process a message
            // if the length of a message queue exceeds a specified maximum length (depending on the machine performance of a client), do nothing, i.e., directly discard this message
            if(messageWithList.length >= MAX_LENGTH) {
            } else {
                // otherwise, continue to process a message
                // add the message obtained by long polling into the tail of a message
```

```
queue to wait for displaying
              messageWithList.push(newMessageWithPath)
            }
          }
        }
      }
      // draw a function of a message queue
      function drawFrame( ) {
        // traverse a message queue
        for (let i = 0; i < messageWithList.length; i++) {
          // if the degree of completion of this message body with a path is greater
than or equal to 1, delete this message from the queue
          if (messageWithList[i].time >= 1) {
            messageWithList.splice(i, 1);
            i--;
          } else {
            // draw this message
            messageWithList[i].draw(context);
          }
        }
        // if there is another message in the queue, invoke a requestAnimationFrame
method of a browser, circularly execute a function of this drawn message queue
        if(messageWithList.length > 0) {
          drawFrame( )
        }
      }
      // execute a function of a drawn message queue
      drawFrame( )
```

In the example embodiments of the present disclosure, a client acquires an interactive message, adds the interactive message into a queue of messages to be displayed, and invokes a pre-created message base class with a motion path according to a preset display duration to sequentially display interactive messages in the queue of messages to be displayed on an interactive interface. A phenomenon of lag of an interactive interface may be reduced, thereby efficiently and smoothly displaying an interactive message, and also flexibly controlling a motion path of the interactive message.

Figure 3:
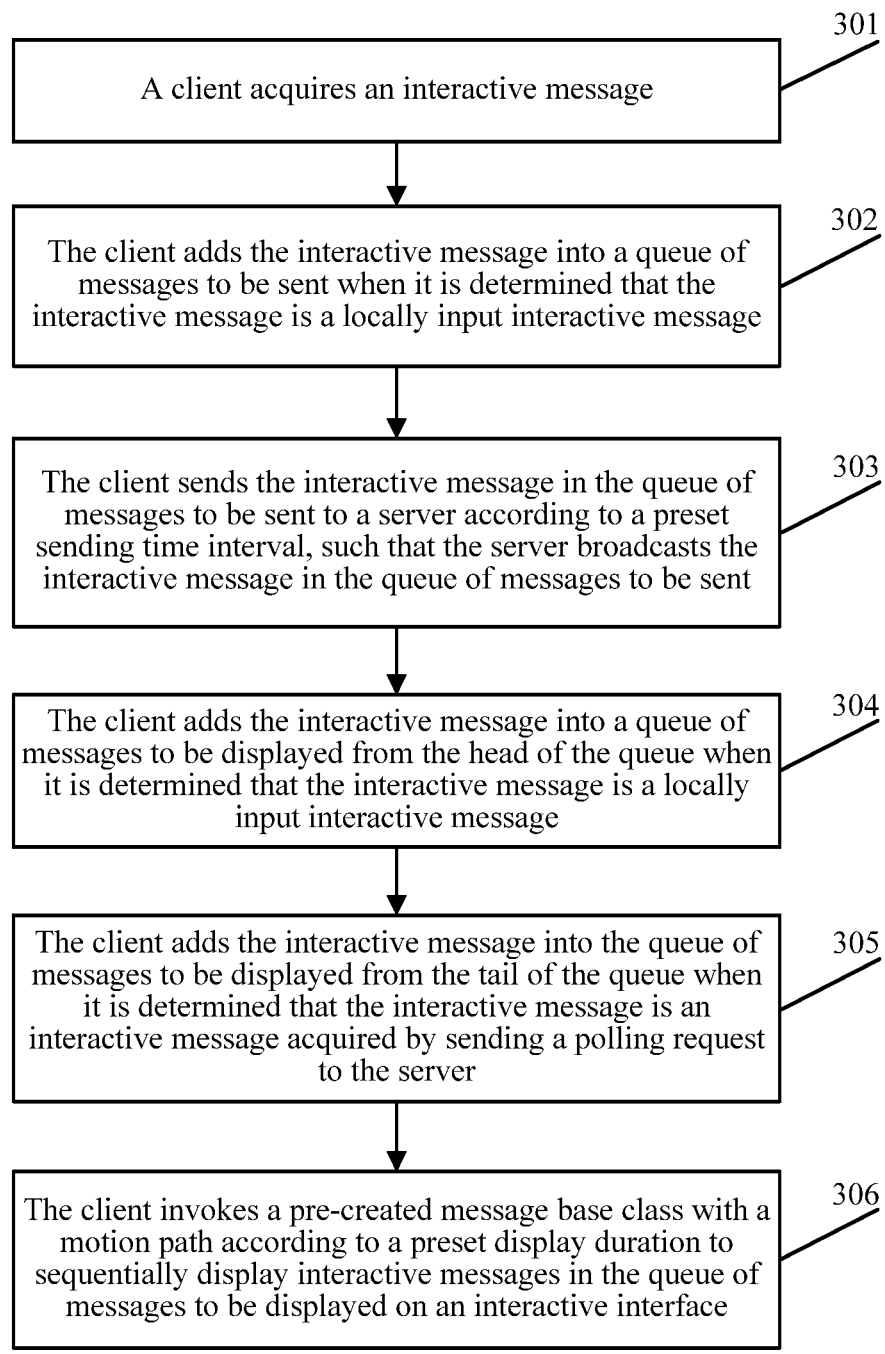
FIG. 3 is a flowchart of a second example embodiment of an interactive message display method according to the certain aspects of the present disclosure.

FIG. 3 is a flowchart of a second example embodiment of an interactive message display method according to certain aspects of the present disclosure. The interactive message display method in FIG. 3 includes the following:

301: A client acquires an interactive message.

302: The client adds the interactive message into a queue of messages to be sent when it is determined that the interactive message is a locally input interactive message.

303: The client sends the interactive message in the queue of messages to be sent to a server according to a preset sending time interval, such that the server broadcasts the interactive message in the queue of messages to be sent.

In some embodiments, when determining that the acquired interactive message is a locally input interactive message, the client may store it in a queue of messages to be sent, and send the interactive message in the queue of messages to be sent to the server according to a preset sending time interval. That is, a locally input interactive message is sent to the server once in a while, instead of being sent to the server through a background interface every time locally input interactive information is acquired, thereby avoiding the phenomena of crash, poor stability and the like of a server due to over-load when a user locally inputs a great amount of interactive information within a short time. After receiving the interactive message, sent by the client according to the preset sending time interval, in the queue of messages to be sent, the server broadcasts it to other clients.

304: The client adds the interactive message into a queue of messages to be displayed from the head of the queue when it is determined that the interactive message is a locally input interactive message.

305: The client adds the interactive message into the queue of messages to be displayed from the tail of the queue when it is determined that the interactive message is an interactive message acquired by sending a polling request to the server.

In some embodiments, when the client determines that the interactive message is an interactive message acquired by sending a polling request to the server, because the client sends locally input interactive information to the server for broadcast, the client also receives the locally input interactive information sent to the server. In order not to repeatedly display the locally input interactive information, the client judges whether the interactive message acquired by sending a polling request to the server is a locally input interactive message. When the interactive message is a locally input interactive message, the client no longer adds this interactive message into a queue of messages to be displayed, and when the acquired interactive message is not a locally input interactive message, the client will add this interactive message into the queue of messages to be displayed from the tail of the queue.

In some implementations, it may be set that the locally input interactive message must be displayed, and for the interactive message acquired by sending a polling request to the server, due to certain limitations on the performance of a canvas element, it may be determined, according to the number of interactive messages in a current queue of messages to be displayed, whether to add the interactive message acquired by sending a polling request to the server into the queue of messages to be displayed. In some implementations, it may be set that only when the number of interactive messages in the current queue of messages to be displayed is smaller than or equal to a preset value (e.g., 40), the interactive message acquired by sending a polling request to the server will be added into the queue of messages to be displayed from the tail of the queue, so as to ensure the performance stability of a canvas element for displaying an interactive message.

In some implementations, if a client corresponds to a paying user or a member user or a very important people (VIP) user or an ordinary user whose level is higher than a preset level, the client may not consider the number of interactive messages in a current queue of messages to be displayed, but directly add an interactive message acquired by sending a polling request to the server into the queue of messages to be displayed from the tail of the queue. A form of adding an identity tag or a level label into an interactive message may indicate that identity and level information about the user corresponding to the client.

306: The client invokes a pre-created message base class with a motion path according to a preset display duration to sequentially display interactive messages in the queue of messages to be displayed on an interactive interface.

In some embodiments, a client acquires an interactive message, adds the interactive message into a queue of messages to be sent when it is determined that the interactive message is a locally input interactive message, and sends the interactive message in the queue of messages to be sent to a server according to a preset sending time interval, such that the server broadcasts the interactive message in the queue of messages to be sent; and the client adds the interactive message into a queue of messages to be displayed from the head of the queue when it is determined that the interactive message is a locally input interactive message, adds the interactive message into the queue of messages to be displayed from the tail of the queue when it is determined that the interactive message is an interactive message acquired by sending a polling request to the server, and invokes a pre-created message base class with a motion path according to a preset display duration to sequentially display interactive messages in the queue of messages to be displayed on an interactive interface. A phenomenon of lag of an interactive interface may be reduced, thereby efficiently and smoothly displaying an interactive message, and also flexibly controlling a motion path of the interactive message.

Figure 4:
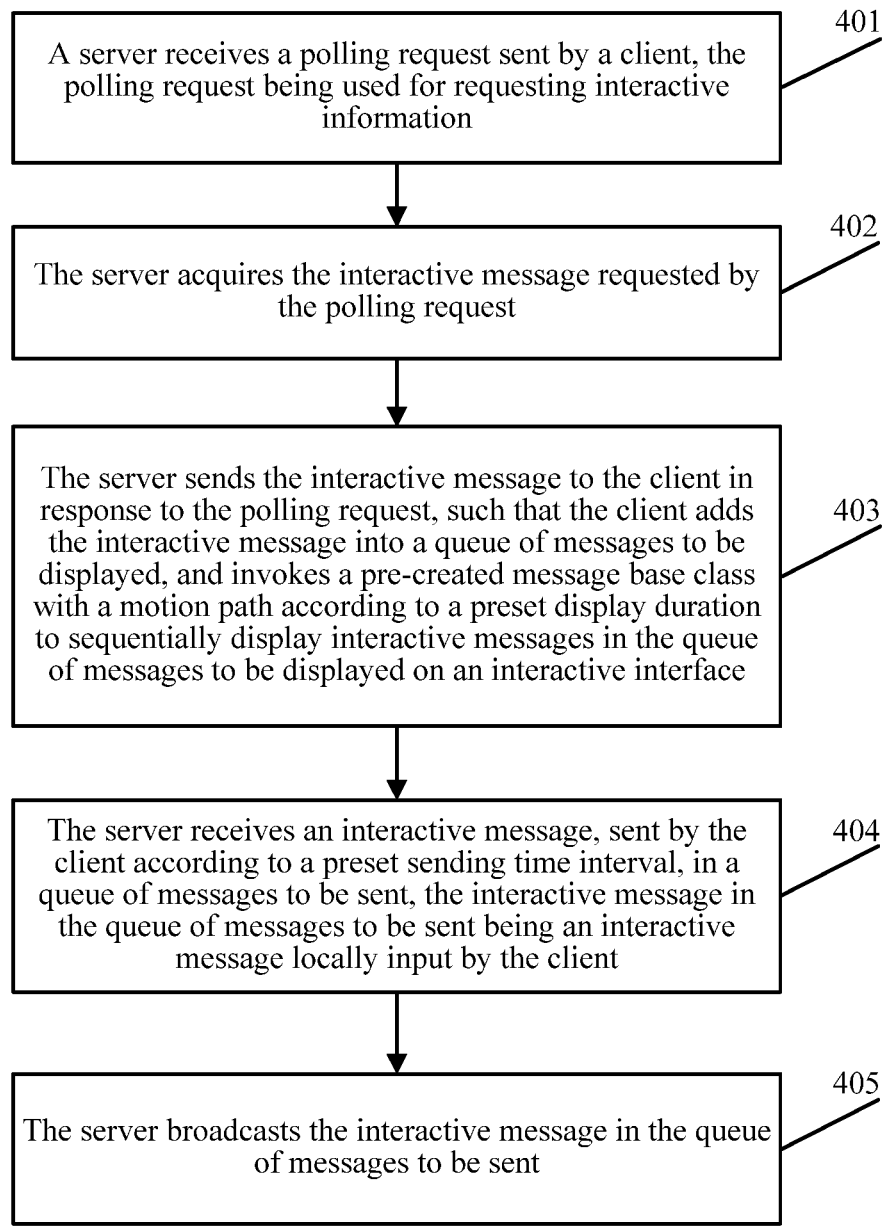
FIG. 4 is a flowchart of a third example embodiment of an interactive message display method according to certain aspects of the present disclosure.

FIG. 4 is a flowchart of a third example embodiment of an interactive message display method according to certain aspects of the present disclosure. The interactive message display method in FIG. 4 includes the following:

401: A server receives a polling request sent by a client, the polling request being used for requesting interactive information.

The interactive message may be, without limitation, a text, an image, an expression, or the like, including an interactive message input locally by the client and an interactive message sent to the client by the server.

402: The server acquires the interactive message requested by the polling request.

403: The server sends the interactive message to the client in response to the polling request, such that the client adds the interactive message into a queue of messages to be displayed, and invokes a pre-created message base class with a motion path according to a preset display duration to sequentially display interactive messages in the queue of messages to be displayed on an interactive interface.

In some embodiments, the polling request may be long polling. That is, the server receives a polling request continuously sent by the client, and sends a latest interactive message requested by the polling request to the client, such that the client adds the interactive message into a queue of messages to be displayed, and invokes a pre-created message base class with a motion path according to a preset display duration to sequentially display interactive messages in the queue of messages to be displayed on an interactive interface.

Referring back to FIG. 4, the interactive message display method may further include the following:

404: The server receives an interactive message, sent by the client according to a preset sending time interval, in a queue of messages to be sent, the interactive message in the queue of messages to be sent being an interactive message locally input by the client.

405: The server broadcasts the interactive message in the queue of messages to be sent.

The client may store the locally input interactive message in a queue of messages to be sent, and send the interactive message in the queue of messages to be sent to the server according to a preset sending time interval. That is, the server receives a locally input interactive message sent by the client once in a while, instead of frequently receiving locally input interactive messages sent by the client, thereby avoiding the phenomena of crash, poor stability and the like of a server due to over-load when a user locally inputs a great amount of interactive information within a short time. After receiving the interactive message, sent by the client according to the preset sending time interval, in the queue of messages to be sent, the server broadcasts it to other clients.

In some embodiments, a server receives a polling request sent by a client, the polling request being used for requesting interactive information; the server acquires an interactive message requested by the polling request, and sends the interactive message to the client, such that the client adds the interactive message into a queue of messages to be displayed, and invokes a pre-created message base class with a motion path according to a preset display duration to sequentially display interactive messages in the queue of messages to be displayed on an interactive interface; the server receives an interactive message, sent by the client according to a preset sending time interval, in a queue of messages to be sent, the interactive message in the queue of messages to be sent being an interactive message locally input by the client; and the server broadcasts the interactive message in the queue of messages to be sent. A phenomenon of lag of an interactive interface may be reduced, thereby efficiently and smoothly displaying an interactive message, and also flexibly controlling a motion path of the interactive message.

Figure 5:
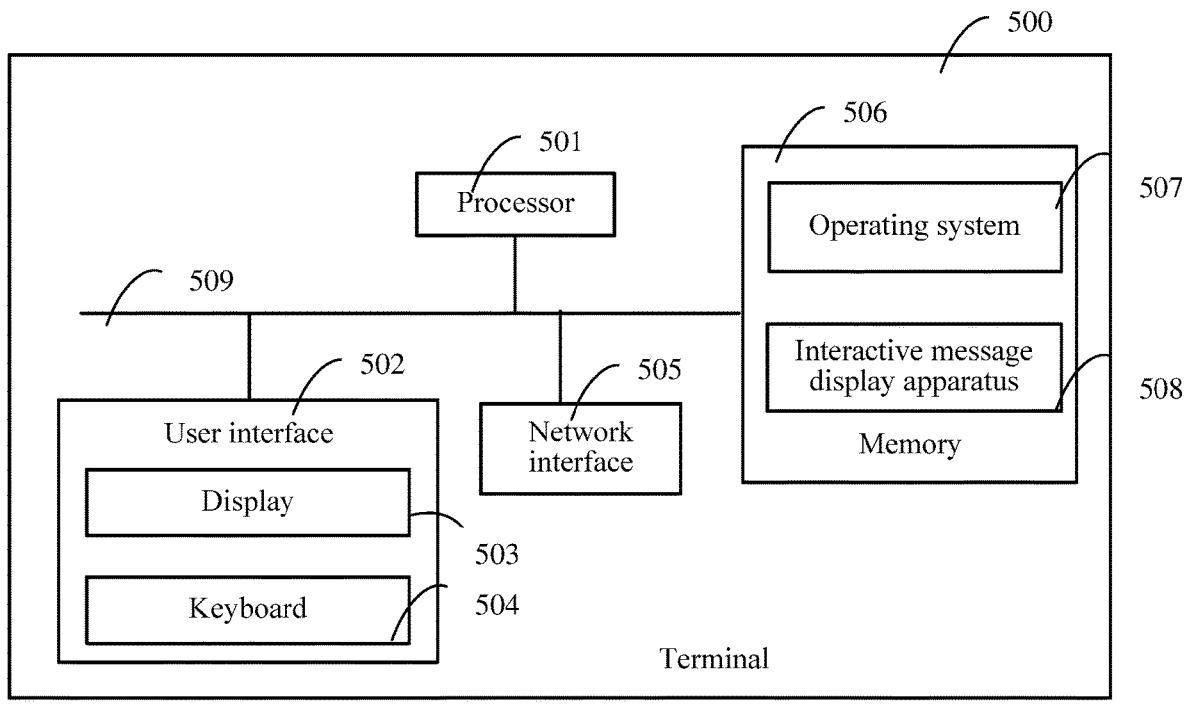
FIG. 5 is a schematic structure diagram of an example embodiment of a terminal certain aspects of the present disclosure.

Interactive message display systems according to certain aspects of the present disclosure also provide a terminal. The terminal may be configured to execute an interactive message display method, such as the interactive message display methods shown in FIG. 1 or FIG. 3. FIG. 5 is a diagram of a terminal 500 according to an example embodiment. Referring to FIG. 5, an internal structure of the terminal 500 includes, but is not limited to, a processor 501, a user interface 502, a network interface 505, and a memory 506. The processor 501, the user interface 502, the network interface 505, and the memory 506 in the terminal 500 may be connected via a bus 509 or other modes.

The user interface 502 is a medium for implementing interaction and information exchange between a user and the terminal 500. It is embodied that the user interface 502 may include a display 503 for output and a keyboard 504 for input. It should be noted that the keyboard 504 may be either a physical keyboard or a touch-screen virtual keyboard. It may also be a combined physical and touch-screen virtual keyboard. The processor 501 (or central processing unit (CPU)) is a computing core and a control core of the terminal 500. It may parse various types of instructions in the terminal 500 and process various types of data of the terminal 500. For example, the processor 501 (CPU) may be configured to parse an on-off instruction sent to the terminal

500 by a user, and control the terminal 500 to perform an on-off operation. The processor 501 (CPU) may transmit various types of interactive data and the like between the internal structures of the terminal 500. The memory 506 is a memory device in the terminal 500, configured to store programs and data. It is understandable that the memory 506 here may include a built-in memory of the terminal 500, and of course, it may also include an extended memory supported by the terminal 500. The memory 506 provides a storage space which stores an operating system of the terminal 500 and may include, but is not limited to, a Windows system (an operating system), an Android system (a mobile operating system), an IOS (a mobile operating system), and the like, which is not limited by the present disclosure. The storage space of the memory 506 stores an interactive message display apparatus. In some embodiments, the interactive message display apparatus may be an application program in the terminal 500. For example, in some embodiments, the apparatus may be a browser application program or the like in the terminal.

In some embodiments, the terminal 500 may execute a method, such as the interactive message display method shown in FIG. 1 or FIG. 3, by running an interactive message display program stored in the memory 506.

Figure 6:
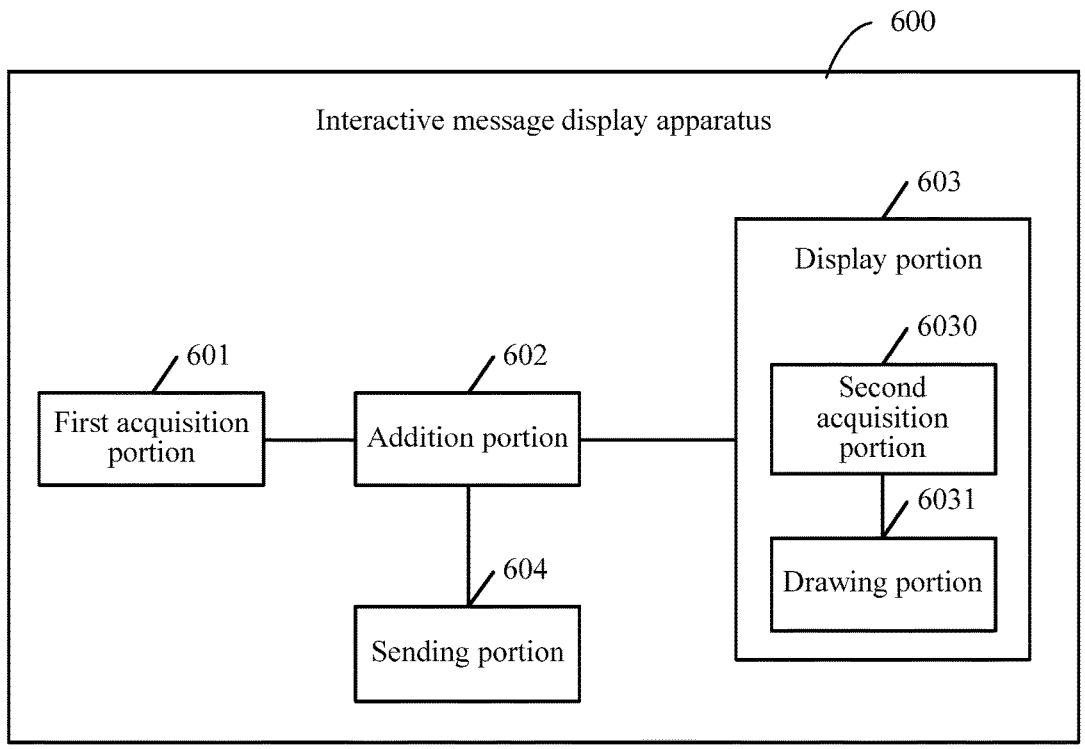
FIG. 6 is a flowchart of a first example embodiment of an interactive message display apparatus according to certain aspects of the present disclosure.

FIG. 6 is a diagram of an interactive message display program 600 according to an example embodiment. A first acquisition portion 601 is configured to acquire an interactive message.

An addition portion 602 is configured to add the interactive message into a queue of messages to be displayed.

A display portion 603 is configured to invoke a pre-created message base class with a motion path according to a preset display duration to sequentially display interactive messages in the queue of messages to be displayed on an interactive interface, the message base class with a motion path being used for specifying motion paths of the interactive messages on the interactive interface.

In some implementations, the display portion 603 may further include:

a second acquisition portion 6030, configured to acquire a pre-created message base class with a motion path, the message base class with a motion path being created according to a message base class containing message public attributes and a motion path base class containing motion path public attributes, and a drawing portion 6031, configured to invoke the message base class with a motion path and sequentially draw interactive messages in the queue of messages to be displayed on a canvas element of the interactive interface according to a preset display duration.

In some implementations, the addition portion 602 may be further configured to add the interactive message into a queue of messages to be sent when it is determined that the interactive message is a locally input interactive message.

The program 600 further includes:

a sending portion 604, configured to send the interactive message in the queue of messages to be sent to a server according to a preset sending time interval, such that the server broadcasts the interactive message in the queue of messages to be sent.

In some implementations, the manner of adding, by the addition portion 602, the interactive message into a queue of messages to be displayed may include:

adding the interactive message into a queue of messages to be displayed from the head of the queue when it is determined that the interactive message is a locally input interactive message, and adding the interactive message into the queue of messages to be displayed from the tail of the queue when it is determined that the interactive message is an interactive message acquired by sending a polling request to the server.

In some implementations, the manner of adding, by the addition portion 602, the interactive message into the queue of messages to be displayed from the tail of the queue when it is determined that the interactive message is an interactive message acquired by sending a polling request to the server may include:

judging, when it is determined that the interactive message is an interactive message acquired by sending a polling request to the server, whether the interactive message acquired by sending a polling request to the server is the locally input interactive message, no longer adding the interactive message into the queue of messages to be displayed when the acquired interactive message is the locally input interactive message, and adding the interactive message into the queue of messages to be displayed from the tail of the queue when the acquired interactive message is not the locally input interactive message.

In some implementations, the manner of adding, by the addition portion 602, the interactive message into the queue of messages to be displayed from the tail of the queue may include:

acquiring the number of interactive messages in a current queue of messages to be displayed, and adding the interactive message into the queue of messages to be displayed from the tail of the queue when the number of interactive messages is smaller than or equal to a preset value.

In some embodiments according to certain aspects of the present disclosure, the first acquisition portion 601 acquires an interactive message, the addition portion 602 adds the interactive message into a queue of messages to be displayed, and the display portion 603 invokes a pre-created message base class with a motion path according to a preset display duration to sequentially display interactive messages in the queue of messages to be displayed on an interactive interface. A phenomenon of lag of an interactive interface may be reduced, thereby efficiently and smoothly displaying an interactive message, and also flexibly controlling a motion path of the interactive message.

Referring back to FIG. 6, in some embodiments, the first acquisition portion 601, the addition portion 602 and the display portion 603 in the apparatus may be all implemented by a CPU, a DSP or an FPGA in practical application, and the sending portion 604 in the apparatus may be implemented by a communication module (including: basic communication suites, operating systems, communication modules, standardized interfaces and protocols, etc.) and a transceiver antenna.

Figure 7:
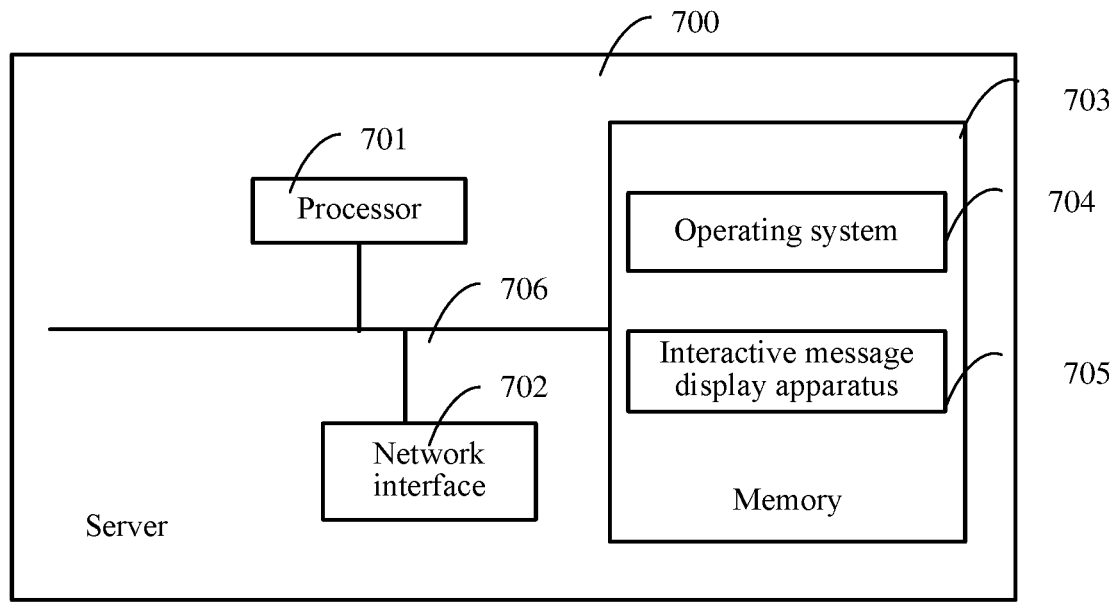
FIG. 7 is a schematic structure diagram of an example embodiment of a server according to certain aspects of the present disclosure.

Some embodiments according to the present disclosure may also provide a server, such as the server 700 shown in FIG. 7. The server 700 may be configured to execute the method shown in FIG. 4. Referring to FIG. 7, an internal structure of the server 700 may include, without limitation, a processor 701, a network interface 702, and a memory 703. The processor 701, the network interface 702, and the memory 703 in the server 700 may be connected via a bus or other modes. In FIG. 7, they are connected via a bus 706.

The processor 701 is a computing core and a control core of the server 700. The network interface 702 may optionally include a standard wired interface and a wireless interface (such as wireless-fidelity (WI-FI) and a mobile communication interface). The memory 703 is a memory device in the server 700, configured to store programs and data. In some implementations, the memory 703 may be a high-speed random access memory (RAM) or a non-volatile memory, such as at least one disk memory. In some embodiments, the memory 703 may also be at least one storage apparatus located away from the foregoing processor 701. The memory 703 provides a storage space which stores an operating system of the server 700 and in some embodiments, the operating system may include, without limitation, a Windows system (an operating system), a Linux system (an operating system) and the like. The storage space of the memory 703 may also store an interactive message display apparatus.

In some embodiments, the server 700 executes a method flow, such as the interactive message display method shown in FIG. 4, by running the interactive message display program in the memory 703.

Figure 8:
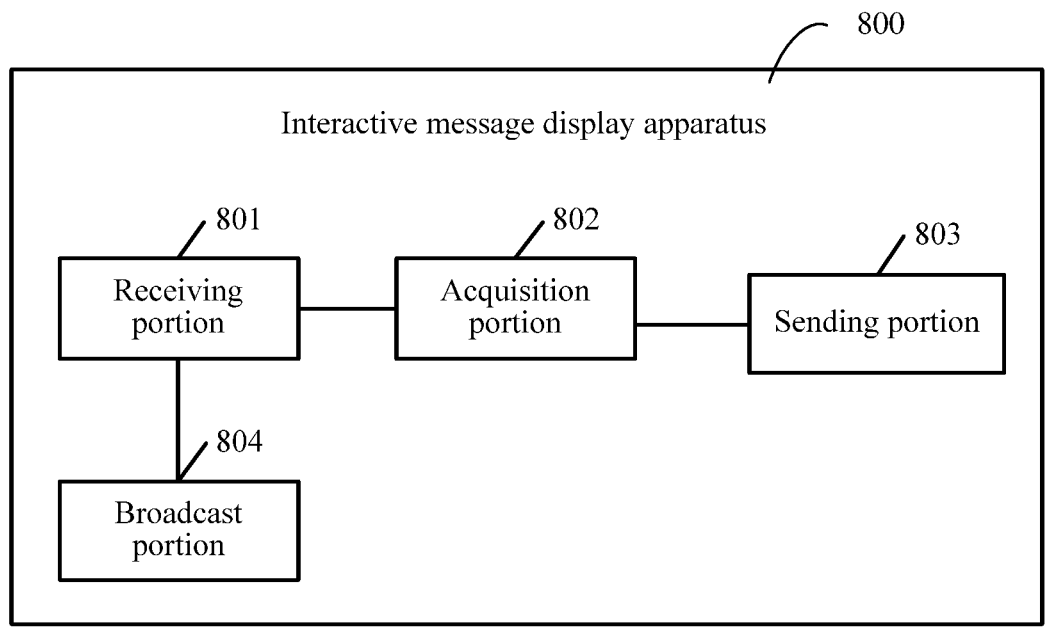
FIG. 8 is a flowchart of a second example embodiment of an interactive message display apparatus according to certain aspects of the present disclosure.

FIG. 8 is an example embodiment of an interactive message display apparatus 800.

A receiving portion 801 is configured to receive a polling request sent by a client, the polling request being used for requesting interactive information.

An acquisition portion 802 is configured to acquire an interactive message requested by the polling request.

A sending portion 803 is configured to send the interactive message to the client in response to the polling request, such that the client adds the interactive message into a queue of messages to be displayed, and invokes a pre-created message base class with a motion path according to a preset display duration to sequentially display interactive messages in the queue of messages to be displayed on an interactive interface, the message base class with a motion path being used for specifying motion paths of the interactive messages on the interactive interface.

In some implementations, the receiving portion 801 is further configured to receive an interactive message, sent by the client according to a preset sending time interval, in a queue of messages to be sent, the interactive message in the queue of messages to be sent being an interactive message locally input by the client.

The apparatus may further include:

a broadcast portion 804, configured to broadcast the interactive message in the queue of messages to be sent.

In some embodiments, the receiving portion 801 receives a polling request sent by a client, the polling request being used for requesting interactive information; the acquisition portion 802 acquires an interactive message requested by the polling request; and the sending portion 803 sends the interactive message to the client in response to the polling request, such that the client adds the interactive message into a queue of messages to be displayed, and invokes a pre-created message base class with a motion path according to a preset display duration to sequentially display interactive messages in the queue of messages to be displayed on an interactive interface. A phenomenon of lag of an interactive interface may be reduced, thereby efficiently and smoothly displaying an interactive message, and also flexibly controlling a motion path of the interactive message.

In some embodiments, the acquisition portion 802 in the apparatus 800 may be implemented by a CPU, a DSP or an FPGA and the receiving portion 801, the sending portion 803 and the broadcast portion 804 in the apparatus 800 may be all implemented by a communication module (including: basic communication suites, operating systems, communication modules, standardized interfaces and protocols, etc.) and a transceiver antenna.

Figure 9:
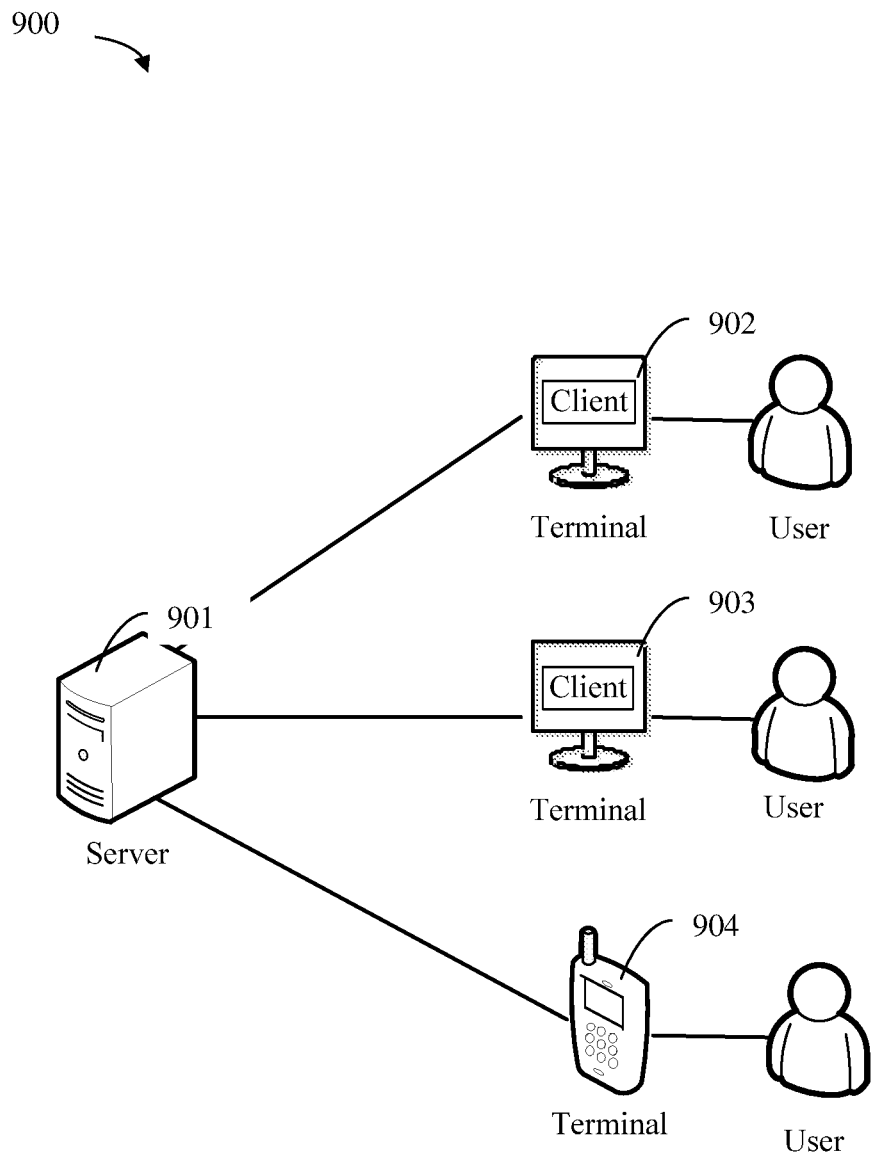
FIG. 9 is a schematic structure diagram of an example embodiment of an interactive message display system according to certain aspects of the present disclosure.

FIG. 9 is a diagram of an example embodiment of an interactive message display system 900 according to certain aspects of the disclosure. The interactive message display system 900 includes at least one terminal (such as terminal 902 or 903), and a client being run on the terminal (such as terminal 902 or 903).

The client is configured to send a polling request to the server 901, the polling request being used for requesting interactive information.

The server 901 is configured to acquire an interactive message requested by the polling request.

The client is also configured to add the interactive message into a queue of messages to be displayed, and further configured to invoke a pre-created message base class with a motion path according to a preset display duration to sequentially display interactive messages in the queue of messages to be displayed on an interactive interface.

The message base class with a motion path is used for specifying motion paths of the interactive messages on the interactive interface.

In some implementations, the manner of invoking, by the client, a pre-created message base class with a motion path according to a preset display duration to sequentially display interactive messages in the queue of messages to be displayed on an interactive interface may include:

acquiring a pre-created message base class with a motion path, the message base class with a motion path being created according to a message base class containing message public attributes and a motion path base class containing motion path public attributes, and invoking the message base class with a motion path according to a preset display duration to sequentially draw interactive messages in the queue of messages to be displayed on a canvas element of the interactive interface.

In some implementations, the client is also configured to add the interactive message into a queue of messages to be sent when it is determined that the interactive message is a locally input interactive message, and further configured to send the interactive message in the queue of messages to be sent to the server according to a preset sending time interval, and the server is further configured to receive the interactive message in the queue of messages to be sent, and broadcast the interactive message in the queue of messages to be sent.

In some implementations, the manner of adding, by the client, the interactive message into a queue of messages to be displayed may include:

adding the interactive message into a queue of messages to be displayed from the head of the queue when it is determined that the interactive message is a locally input interactive message, and adding the interactive message into the queue of messages to be displayed from the tail of the queue when it is determined that the interactive message is an interactive message acquired by sending a polling request to the server.

According to example embodiments, a client sends a polling request to a server, the polling request being used for requesting interactive information; the server acquires an interactive message requested by the polling request, and sends the interactive message to the client; and the client adds the interactive message into a queue of messages to be displayed, and invokes a pre-created message base class with a motion path according to a preset display duration to sequentially display interactive messages in the queue of messages to be displayed on an interactive interface. A phenomenon of lag of an interactive interface may be reduced, thereby efficiently and smoothly displaying an interactive message, and also flexibly controlling a motion path of the interactive message.

Some example embodiments of the present disclosure may also provide an interactive message display apparatus, applied to a terminal, and including: a processor, and a memory configured to store a computer program executable by the processor, Executing the computer program by the processor may include:

acquiring an interactive message, adding the interactive message into a queue of messages to be displayed, and invoking a pre-created message base class with a motion path according to a preset display duration to sequentially display interactive messages in the queue of messages to be displayed on an interactive interface, the message base class with a motion path being used for specifying motion paths of the interactive messages on the interactive interface.

In some embodiments, when running the computer program, the processor is further configured to execute:

acquiring a pre-created message base class with a motion path, the message base class with a motion path being created according to a message base class containing message public attributes and a motion path base class containing motion path public attributes, and invoking the message base class with a motion path according to a preset display duration to sequentially draw interactive messages in the queue of messages to be displayed on a canvas element of the interactive interface.

In some embodiments, when running the computer program, the processor is further configured to execute:

adding the interactive message into a queue of messages to be displayed when it is determined that the interactive message is a locally input interactive message, and sending the interactive message in the queue of messages to be sent to a server according to a preset sending time interval, such that the server broadcasts the interactive message in the queue of messages to be sent.

In some embodiments, when running the computer program, the processor is further configured to execute:

adding the interactive message into a queue of messages to be displayed from the head of the queue when it is determined that the interactive message is a locally input interactive message, and adding the interactive message into the queue of messages to be displayed from the tail of the queue when it is determined that the interactive message is an interactive message acquired by sending a polling request to the server.

In some embodiments, when running the computer program, the processor is further configured to execute:

judging, when it is determined that the interactive message is an interactive message acquired by sending a polling request to the server, whether the interactive message acquired by sending a polling request to the server is the locally input interactive message, no longer adding the interactive message into the queue of messages to be displayed when the acquired interactive message is the locally input interactive message, and adding the interactive message into the queue of messages to be displayed from the tail of the queue when the acquired interactive message is not the locally input interactive message.

In some embodiments, when running the computer program, the processor is further configured to execute:

acquiring the number of interactive messages in a current queue of messages to be displayed, and adding the interactive message into the queue of messages to be displayed from the tail of the queue when the number of interactive messages is smaller than or equal to a preset value.

The example embodiments according to certain aspects of the present disclosure also provide an interactive message display apparatus, applied to a server, and including: a processor, and a memory configured to store a computer program runnable on the processor.

When running the computer program, the processor executing:

receiving a polling request sent by a client, the polling request being used for requesting interactive information, acquiring an interactive message requested by the polling request, and sending the interactive message to the client in response to the polling request, such that the client adds the interactive message into a queue of messages to be displayed, and invokes a pre-created message base class with a motion path according to a preset display duration to sequentially display interactive messages in the queue of messages to be displayed on an interactive interface, the message base class with a motion path being used for specifying motion paths of the interactive messages on the interactive interface.

When running the computer program, the processor is further configured to execute:

receiving an interactive message, sent by the client according to a preset sending time interval, in a queue of messages to be sent, the interactive message in the queue of messages to be sent being an interactive message locally input by the client, and broadcasting the interactive message in the queue of messages to be sent.

Some embodiments of the present disclosure also provide a computer readable storage medium having computer-executable instructions stored therein, the computer-executable instructions being used for:

acquiring an interactive message, adding the interactive message into a queue of messages to be displayed, and invoking a pre-created message base class with a motion path according to a preset display duration to sequentially display interactive messages in the queue of messages to be displayed on an interactive interface, the message base class with a motion path being used for specifying motion paths of the interactive messages on the interactive interface.

In some embodiments, the computer-executable instructions are further used for executing:

acquiring a pre-created message base class with a motion path, the message base class with a motion path being created according to a message base class containing message public attributes and a motion path base class containing motion path public attributes, and invoking the message base class with a motion path according to a preset display duration to sequentially draw interactive messages in the queue of messages to be displayed on a canvas element of the interactive interface.

In some embodiments, the computer-executable instructions are further used for executing:

adding the interactive message into a queue of messages to be displayed when it is determined that the interactive message is a locally input interactive message, and sending the interactive message in the queue of messages to be sent to a server according to a preset sending time interval, such that the server broadcasts the interactive message in the queue of messages to be sent.

In some embodiments, the computer-executable instructions are further used for executing:

adding the interactive message into a queue of messages to be displayed from the head of the queue when it is determined that the interactive message is a locally input interactive message, and adding the interactive message into the queue of messages to be displayed from the tail of the queue when it is determined that the interactive message is an interactive message acquired by sending a polling request to the server.

In some embodiments, the computer-executable instructions are further used for executing:

judging, when it is determined that the interactive message is an interactive message acquired by sending a polling request to the server, whether the interactive message acquired by sending a polling request to the server is the locally input interactive message, if so, no longer adding the interactive message into the queue of messages to be displayed, and otherwise, adding the interactive message into the queue of messages to be displayed from the tail of the queue.

In some embodiments, the computer-executable instructions are further used for executing:

acquiring the number of interactive messages in a current queue of messages to be displayed, and adding the interactive message into the queue of messages to be displayed from the tail of the queue when the number of interactive messages is smaller than or equal to a preset value.

The example embodiments according to certain aspects of the present disclosure also provide a computer readable storage medium having computer-executable instructions stored therein, the computer-executable instructions being used for executing:

receiving a polling request sent by a client, the polling request being used for requesting interactive information, acquiring an interactive message requested by the polling request, and sending the interactive message to the client in response to the polling request, such that the client adds the interactive message into a queue of messages to be displayed, and invokes a pre-created message base class with a motion path according to a preset display duration to sequentially display interactive messages in the queue of messages to be displayed on an interactive interface, the message base class with a motion path being used for specifying motion paths of the interactive messages on the interactive interface.

In some embodiments, the computer-executable instructions are further used for executing:

receiving an interactive message, sent by the client according to a preset sending time interval, in a queue of messages to be sent, the interactive message in the queue of messages to be sent being an interactive message locally input by the client, and broadcasting the interactive message in the queue of messages to be sent.

A person of ordinary skill in the art may understand that all or some of flows in the above-mentioned embodiment methods may be implemented by instructing relevant hardware via a computer program, wherein the program may be stored in a computer-readable storage medium, and may include the flow of each of the above-mentioned method embodiments when being executed. The storage medium may be a magnetic disk, an optical disk, a read-only memory (ROM) or an RAM.

The interactive message display method, apparatus and system provided in the example embodiments of the present disclosure have been described in detail above. Specific examples are used herein to explain the principles and implementation manners of the present disclosure. The above example embodiments are only used to assist in understanding the method and the core idea of the present disclosure. Moreover, for a person of ordinary skill in the art, according to the idea of the present disclosure, there will be changes in specific implementation manners and an application scope. In summary, the content of the present specification should not be interpreted as limitations to the present disclosure.

What is claimed is:

1. A method comprising:

acquiring, by a client, an interactive message;

adding, by the client, the acquired interactive message into a queue of interactive messages to be displayed; and invoking, by the client, a previously created message base class with a motion path according to a display duration and sequentially displaying on an interactive interface, the interactive messages in the queue of interactive messages to be displayed, wherein the message base class with the motion path specifies a plurality of motion paths through which the interactive messages are moved when the interactive messages are sequentially displayed on the interactive interface, wherein the interactive messages in the queue are sequentially displayed to move through the motion paths according to the motion paths indicated by the message base class, and wherein the invoking further comprises:

acquiring, by the client, the previously created message base class with the motion path, the previously created message base class with the motion path being created according to a message base class containing a plurality of message public attributes and a motion path base class containing a plurality of motion path public attributes; and invoking, by the client, the previously created message base class with a motion path according to the display duration to sequentially draw the interactive messages in the queue of interactive messages to be displayed on a canvas element of the interactive interface.

2. The method according to claim 1, wherein the interactive messages are drawn on the canvas element according to the plurality of message public attributes, the message public attributes include a radius, a rotation angle and a transparency of message content, and the plurality of motion path public attributes include a start point of the motion path and the end point of the motion path.

3. The method according to claim 1, the method further comprising:

adding, by the client, the acquired interactive message into a queue of messages to be sent in response to determining that the acquired interactive message is locally input; and sending, by the client to a server, the acquired interactive message in the queue of interactive messages to be sent according to a sending time interval.

4. The method according to claim 1, wherein adding, by the client, the interactive message into the queue of interactive messages to be displayed further comprises:

adding, by the client, the acquired interactive message into the queue of interactive messages to be displayed from a head of the queue in response to determining that the interactive message is locally input; and adding, by the client, the interactive message into the queue of messages to be displayed from a tail of the queue in response to determining that the interactive message is acquired by sending a polling request to the server.

5. The method according to claim 4, wherein adding, by the client, the interactive message into the queue of messages to be displayed from the tail of the queue further comprises:
evaluating, by the client, in response to determining that the interactive message is acquired by sending a polling request to the server, whether the interactive message is the locally input interactive message;
not adding, by the client, the interactive message into the queue of messages to be displayed if the acquired interactive message is the locally input interactive message; and
adding, by the client, the interactive message into the queue of messages to be displayed from the tail of the queue if the acquired interactive message is not the locally input interactive message.

6. The method according to claim 5, wherein adding, by the client, the interactive message into the queue of messages from the tail of the queue further comprises:
acquiring, by the client, a number of interactive messages in a current queue of messages to be displayed; and
adding, by the client, the interactive message into the queue of messages to be displayed from the tail of the queue when the number of interactive messages is smaller than or equal to a threshold value.

7. A method comprising:
receiving, by a server, a polling request sent by a client, the polling request being used for requesting interactive information;
acquiring, by the server, an interactive message requested by the polling request; and
sending, by the server, the acquired interactive message to the client in response to the polling request for adding the interactive message into a queue of messages to be displayed on an interactive interface, and for invoking a pre-created message base class with a motion path according to a preset display duration to sequentially display the interactive messages in the queue of messages to be displayed,
wherein the message base class with the motion path specifies a plurality of motion paths through which the acquired interactive messages are to be moved when the interactive messages are displayed on the interactive interface, and
wherein the interactive messages in the queue are sequentially displayed to move through the motion paths according to the motion paths indicated by the message base class, and
wherein the server sends to the client the pre-created created message base class with the motion path, the pre-created message base class with the motion path being created according to a message base class containing a plurality of message public attributes and a motion path base class containing a plurality of motion path public attributes; and
the interactive messages in the queue are sequentially displayed by sequentially drawing the interactive messages on a canvas element of the interactive interface according to the previously created message base class with a motion path and the display duration.

8. The method according to claim 7, wherein the interactive messages are displayed according to a plurality of message public attributes, and
the plurality of message public attributes include a radius, a rotation angle and a transparency of message content.

9. The method according to claim 7, further comprising:
receiving, by the server, the interactive message, from the client according to a sending time interval, in a queue of messages to be sent, the interactive message in the queue of messages to be sent being an interactive message locally input by the client; and
broadcasting, by the server, the interactive message in the queue of messages to be sent.

10. An apparatus comprising:
at least one memory configured to store computer program code; and
at least one processor configured to access said at least one memory and operate according to said computer program code, said computer program code including:
first acquisition code, configured to cause the at least one processor to acquire an interactive message;
addition code, configured to cause the at least one processor to add the interactive message into a queue of messages to be displayed; and
display code, configured to cause the at least one processor to invoke a previously created message base class with a motion path according to a display duration to sequentially display interactive messages in the queue of messages to be displayed on an interactive interface,
wherein the message base class with the motion path specifies a plurality of motion paths through which the interactive messages are moved when the interactive messages are displayed on the interactive interface,
wherein the interactive messages in the queue are sequentially displayed to move through the motion paths according to the motion paths indicated by the message base class, and
wherein the display code further comprises:
second acquisition code, configured to cause the at least one processor to acquire the previously created message base class with the motion path, the previously created message base class with the motion path being created according to a message base class containing a plurality of message public attributes and a motion path base class containing a plurality of motion path public attributes; and
drawing code, configured to cause the at least one processor to invoke the message base class with the motion path according to the display duration to sequentially draw interactive messages in the queue of messages to be displayed on a canvas element of the interactive interface.

11. The method according to claim 10, wherein the interactive messages are drawn on the canvas element is according to the plurality of message public attributes,
the plurality of message public attributes include a radius, a rotation angle and a transparency of message content, and
the plurality of motion path public attributes include a start point of the motion path and the end point of the motion path.

12. The apparatus according to claim 10, wherein
the addition code is further configured to cause the at least one processor to add the interactive message into a queue of messages to be sent when it is determined that the interactive message is a locally input interactive message, and the computer program code further comprises:

sending code, configured to cause the at least one processor to send to a server the interactive message in the queue of messages to be sent according to a sending time interval for broadcasting the interactive message in the queue of messages to be sent.

13. The apparatus according to claim 10, wherein the addition code is further configured to cause at least one processor to:

add the interactive message into a queue of messages to be displayed from a head of the queue when it is determined that the interactive message is a locally input interactive message; and add the interactive message into the queue of messages to be displayed from a tail of the queue when it is determined that the interactive message is an interactive message acquired by sending a polling request to the server.

14. The apparatus according to claim 13, wherein the addition code is further configured to cause at least one processor to determine, when it is determined that the interactive message is an interactive message acquired by sending a polling request to the server, whether the interactive message is the locally input interactive message;

not add the interactive message into the queue of messages to be displayed when the acquired interactive message is the locally input interactive message; and add the interactive message into the queue of messages to be displayed from the tail of the queue when the acquired interactive message is not the locally input interactive message.

15. The apparatus according to claim 14, wherein the addition code is further configured to cause at least one processor to:

acquire a number of interactive messages in a current queue of messages to be displayed; and add the interactive message into the queue of messages to be displayed from the tail of the queue when the number of interactive messages is smaller than or equal to a threshold value.

16. An apparatus comprising:

at least one memory configured to store computer program code; and at least one processor configured to access said at least one memory and operate according to said computer program code, said computer program code including:

receiving code, configured to cause the at least one processor to receive a polling request from a client, the polling request being used for requesting interactive information;

acquisition code, configured to cause at least one processor to acquire an interactive message requested by the polling request; and sending code, configured to cause at least one processor to send the interactive message to the client in response to the polling request for adding the interactive message into a queue of messages to be displayed, and for invoking a pre-created message base class with a motion path according to a display duration to sequentially display interactive messages in the queue of messages to be displayed on an interactive interface, wherein the message base class with the motion path specifies a plurality of motion paths through which the interactive messages are to be moved when the interactive messages are displayed on the interactive interface, wherein the interactive messages in the queue are sequentially displayed to move through the motion paths according to the motion paths indicated by the message base class, and wherein the sending code is further configured to cause the at least one processor to send to the client the pre-created created message base class with the motion path, the pre-created message base class with the motion path being created according to a message base class containing a plurality of message public attributes and a motion path base class containing a plurality of motion path public attributes; and the interactive messages in the queue are sequentially displayed by sequentially drawing the interactive messages on a canvas element of the interactive interface according to the previously created message base class with a motion path and the display duration.

17. The apparatus according to claim 16, wherein the receiving code is further configured to cause the at least one processor to receive an interactive message, from the client according to a sending time interval, in a queue of messages to be sent, the interactive message in the queue of messages to be sent being an interactive message locally input by the client, and wherein the apparatus further comprising:

broadcast code, configured to cause at least one processor to broadcast the interactive message in the queue of messages to be sent.

18. A non-transitory computer readable storage medium storing a program comprising instructions executable by a processor to cause the processor to perform operations including:

acquiring an interactive message;

adding the acquired interactive message into a queue of interactive messages to be displayed; and invoking a pre-created previously created message base class with a motion path according to a display duration and sequentially displaying on an interactive interface, the interactive messages in the queue of interactive messages to be displayed, wherein the message base class with the motion path specifies a plurality of motion paths through which the interactive messages are moved when the interactive messages are sequentially displayed on the interactive interface, wherein the interactive messages in the queue are sequentially displayed to move through the motion paths according to the motion paths indicated by the message base class, and wherein the invoking further comprises:

acquiring, by the client, the previously created message base class with the motion path, the previously created message base class with the motion path being created according to a message base class containing a plurality of message public attributes and a motion path base class containing a plurality of motion path public attributes; and invoking, by the client, the previously created message base class with a motion path according to the display duration to sequentially draw the interactive messages in the queue of interactive messages to be displayed on a canvas element of the interactive interface.

* * * * *